United States Patent [19]

Sorensen

[11] Patent Number: 5,043,129
[45] Date of Patent: * Aug. 27, 1991

[54] HOLD-PRESSURE CONTROL AND CLAMPING IN STACKED MULTI-PARTING MOLDING SYSTEM HAVING DESYNCHRONIZED INJECTION PERIODS

[75] Inventor: Jens O. Sorensen, Rancho Santa Fe, Calif.

[73] Assignee: Primtec, Rancho Santa Fe, Calif.

[*] Notice: The portion of the term of this patent subsequent to Jun. 11, 2008 has been disclaimed.

[21] Appl. No.: 487,971
[22] PCT Filed: Jul. 8, 1988
[86] PCT No.: PCT/US88/02330
§ 371 Date: Jan. 5, 1990
§ 102(e) Date: Jan. 5, 1990
[87] PCT Pub. No.: WO89/00103
PCT Pub. Date: Jan. 12, 1989

Related U.S. Application Data

[63] Continuation-in-part of Ser. No. 327,373, Mar. 22, 1989, and a continuation-in-part of Ser. No. 336,650, Apr. 7, 1989, Pat. No. 4,990,299, which is a continuation of Ser. No. 115,902, Nov. 2, 1987, abandoned, said Ser. No. 327,373, is a continuation of Ser. No. 70,850, Jul. 8, 1987, abandoned.

[51] Int. Cl.$^5$ .............................................. B29C 45/12
[52] U.S. Cl. .................... 264/297.2; 264/328.8; 264/328.11; 425/555; 425/559; 425/561; 425/562; 425/572; 425/574; 425/588; 425/589
[58] Field of Search .............. 264/297.2, 328.1, 328.11, 264/328.12, 328.8; 425/149, 555, 557, 558, 559, 561, 562, 572, 588, 574, 595, 589

[56] References Cited

U.S. PATENT DOCUMENTS

| | | | |
|---|---|---|---|
| 2,371,061 | 3/1945 | Milano | 425/395 |
| 2,416,348 | 2/1947 | Renier | 425/DIG. 221 |
| 2,597,592 | 5/1952 | Minder | 425/395 |
| 3,049,757 | 8/1962 | Hagerborg . | |
| 3,417,433 | 12/1968 | Teraoka . | |
| 3,709,644 | 1/1973 | Farrell | 425/160 |
| 3,809,739 | 5/1974 | Gelin | 264/325 |
| 3,847,525 | 11/1974 | Bielfeldt et al. | 425/555 |
| 3,996,330 | 12/1976 | Jones et al. | 425/561 |
| 4,090,837 | 5/1978 | Balevski et al. | 425/589 |
| 4,120,921 | 10/1978 | Webster | 264/23 |
| 4,146,600 | 3/1979 | Elly et al. | 264/39 |
| 4,153,405 | 5/1979 | Elly et al. | 425/339 |
| 4,212,626 | 7/1980 | Gellert | 425/562 |
| 4,242,073 | 12/1980 | Tsuchiya et al. | 425/555 |
| 4,244,909 | 1/1981 | Gellert . | |
| 4,342,717 | 8/1982 | Gardner | 264/328.8 |
| 4,364,720 | 12/1982 | Ryder | 425/595 |
| 4,376,622 | 3/1983 | Coffey | 425/451.9 |
| 4,400,341 | 8/1983 | Sorensen | 264/328.8 |
| 4,464,327 | 8/1984 | Sorensen | 264/331.11 |
| 4,738,814 | 4/1988 | Bowles et al. | 264/297.7 |
| 4,753,592 | 6/1988 | Kaaden | 264/328.8 |
| 4,867,938 | 9/1989 | Schad et al. | 264/297.2 |

FOREIGN PATENT DOCUMENTS

| | | |
|---|---|---|
| 58-166030 | 10/1983 | Japan . |
| 59-225924 | 12/1984 | Japan ............................... 264/297.1 |
| 62-35817 | 2/1987 | Japan . |
| 625461 | 9/1981 | Switzerland . |

Primary Examiner—Jill L. Heitbrink
Attorney, Agent, or Firm—Edward W. Callan

[57] ABSTRACT

A system and method of controlling hold pressure applied to molding cavities of a stacked multi-parting injection molding system having desynchronized injection periods while cyclic injection molding a plastic material. A combination of the center molding block and an injection system together provide an adjustable feed system. The feed system is adjusted to enable plastic material to be fed from the injection system through a left branch to the left molding cavity. The injection system is pressurized to inject the plastic material through the left branch to fill the left molding cavity. The injected plastic material is confined within the left branch and the left molding cavity; and the confined plastic material is hold pressurized by a movable packing element. A like sequence of steps is followed to hold pressurize the right molding cavity. When the molding cavities have desynchronous opening periods, the closed molding cavity is locked to maintain it in a closed position while the other molding cavity is open; and axial clamping force is applied to the locked molding cavity by expanding the thickness of at least one of the molding blocks that defines the locked molding cavity.

19 Claims, 6 Drawing Sheets

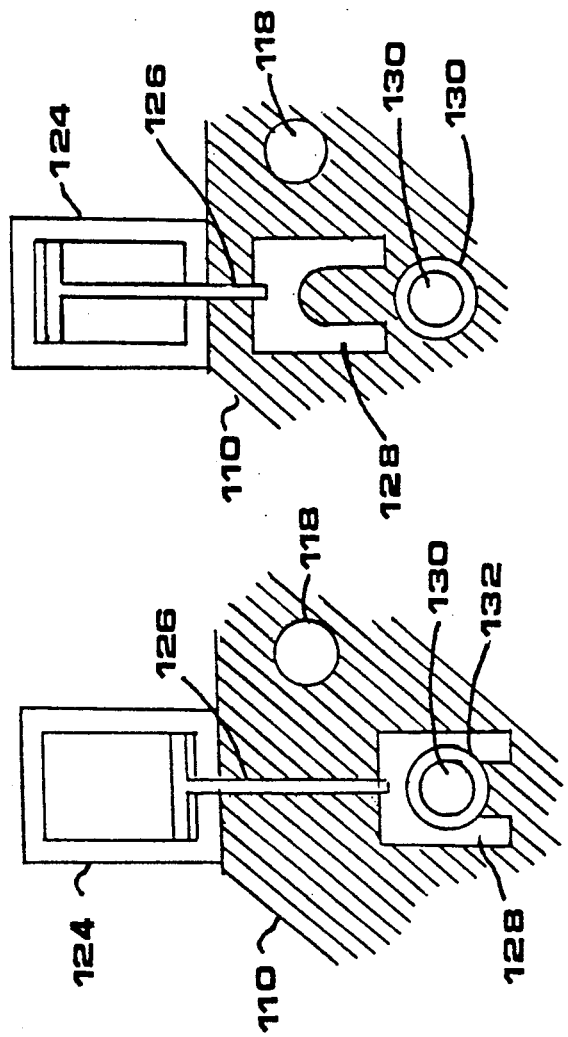

HOLD-PRESSURE CONTROL AND CLAMPING IN STACKED MULTI-PARTING MOLDING SYSTEM HAVING DESYNCHRONIZED INJECTION PERIODS

REFERENCE TO RELATED APPLICATIONS

This is a continuation-in-part of U.S. patent application Ser. No. 07/327,373 filed Mar. 22, 1989 which is a continuation of U.S. application Ser. No. 07/070,850 filed July 8, 1987, now abandoned, and a continuation-in-part of U.S. application Ser. No. 07/336,650, file Apr. 7, 1989 now U.S. Pat. No. 4,990,299 issued Feb. 5, 1991 which is a continuation of U.S. application Ser. No. 07/115,902 filed Nov. 2, 1987, now abandoned.

BACKGROUND OF THE INVENTION

The present invention generally pertains to molding systems and methods and is particularly directed to control of hold pressure and clamping in a stacked multi-parting molding system having desynchronized injection periods.

A stacked multi-parting molding system includes at least three molding blocks disposed for movement along a common axis with respect to each other. Molding cavities are defined between adjacent molding blocks. In a desynchronized stacked multi-parting molding system that includes left, center, and right molding blocks for defining a left molding cavity between the left and center molding blocks and a right molding cavity between the center and right molding blocks, positioning means move the left, center and right molding blocks along the common axis with respect to each other in such a sequence that the opening and closing of the left and right molding cavities may be desynchronized. Desynchronized stacked multi-parting molding systems are described in U.S. Pat. Nos. 4,400,431, 4,464,327 and 4,539,171, all to Jens Ole Sorensen and 4,146,600 to Elly et al. Desynchronized injection of plastic material into the molding cavities may take place when both mold cavities are closed, as well as when one molding cavity is open and the other mold cavity is closed.

Hold pressure is the pressure applied to plastic material injected into a molding cavity of an injection molding system after the molding cavity is initially filled with plastic by an injection system. Hold pressure is applied to force additional plastic material into the molding cavity as the initially injected material shrinks in the molding cavity upon hardening in order to assure that the plastic material completely fills the cavity. Otherwise the molded product may be crimped.

In a prior art stacked multi-parting molding system, the injection system is used to apply hold pressure in the molding cavities. However, the use of the injection system to apply hold pressure may increase the cycle time because less time will be available during the molding cycle for plasticization of the molding material prior to injection. Also, with typical desynchronized stacked molding systems, when at least one of the molding cavities is opened, the injection system is separated from the remainder of the feed system that carries the plastic material to the molding cavities, thereby reducing the time available for the injection system to apply hold pressure.

While hold pressure is being applied to the molding cavities, the molding cavities must be tightly clamped. While both molding cavities are closed, the means that position the molding blocks apply an axial clamping force to the molding cavities along their common axis to thereby tightly clamp the molding cavities. However, whenever one molding cavity is opened, this axial clamping force is no longer applied by the positioning means. Although Elly et al describe the use of wedge-shaped locking means for maintaining one molding cavity in a closed position while the other molding cavity is in an open position, the axial clamping force that is applied by the wedge-shaped locking means to the molding cavity that remains closed is significantly less than that applied by the positioning means when both molding cavities are closed, and typically is insufficient to enable adequate hold pressure to be applied to the closed molding cavity.

SUMMARY OF THE INVENTION

The present invention provides an improved system and method of controlling hold pressure applied to molding cavities of a stacked multi-parting injection molding system having desynchronized injection periods while cyclic injection molding a plastic material. The molding system includes left, center and right molding blocks disposed for movement with respect to each other along a common axis and defining a left molding cavity between the left and center molding blocks and a right molding cavity between the center and right molding blocks. A combination of the center molding block and an injection system together provide an adjustable feed system, which within the center molding block has a left branch for feeding the left molding cavity, a right branch for feeding the right molding cavity, and means for confining injected plastic material in the respective branches and molding cavities. This system accomplishes the method of the present invention by sequentially (a) adjusting the feed system to enable plastic material to be fed from the injection system through the left branch to the left molding cavity;

(b) pressurizing the injection system to inject the plastic material through the left branch to fill the left molding cavity;

(c) confining the plastic material injected into the left branch and the left molding cavity; and (d) hold pressurizing the plastic material confined in the left branch and the left molding cavity and by sequentially (e) adjusting the feed system to enable plastic material to be fed from the injection system through the right branch to the right molding cavity;

(f) pressurizing the injection system to inject the plastic material through the right branch to fill the right molding cavity;

(g) confining the plastic material injected into the right branch and the right molding cavity; and (h) hold pressurizing the plastic material confined in the right branch and the right molding cavity.

These two sequences (a)–(d) and (e)–(h) may be overlapping.

The molding system of the present invention may further include movable packing means for hold pressurizing the plastic material confined in the respective branches and molding cavities. Accordingly, step (d) further comprises moving a packing means to further hold pressurize the plastic material confined in the left branch and the left molding cavity; and step (h) further comprises moving a packing means to further hold pressurize the plastic material confined in the right branch and the right molding cavity.

When the molding cavities have desynchronous opening periods, the method includes the further steps of (i) locking one of the molding cavities to maintain it in a closed position while the other molding cavity is open; and (j) applying axial clamping force to the locked molding cavity by expanding the thickness of at least one of the molding blocks that defines the locked molding cavity.

The present invention thus also provides a system and method for providing additional axial clamping force to one molding cavity of a desynchronized stacked multi-parting molding system while one molding cavity is open and the other molding cavity is maintained in a closed position by a locking means, with said additional axial clamping force being provided by expanding the thickness of at least one of the molding blocks that defines the one molding cavity.

Additional features of the invention are described with reference to the description of the preferred embodiments.

BRIEF DESCRIPTION OF THE DRAWING

FIG. 8 is a sectional view of a portion of a locking mechanism included in the system of FIGS. 6 and 7, taken along line 8—8 of FIG. 6.

FIG. 9 is a sectional view of a portion of a locking mechanism included in the system of FIGS. 6 and 7, taken along line 9—9 of FIG. 7.

DESCRIPTION OF THE PREFERRED EMBODIMENT

Figure 1:
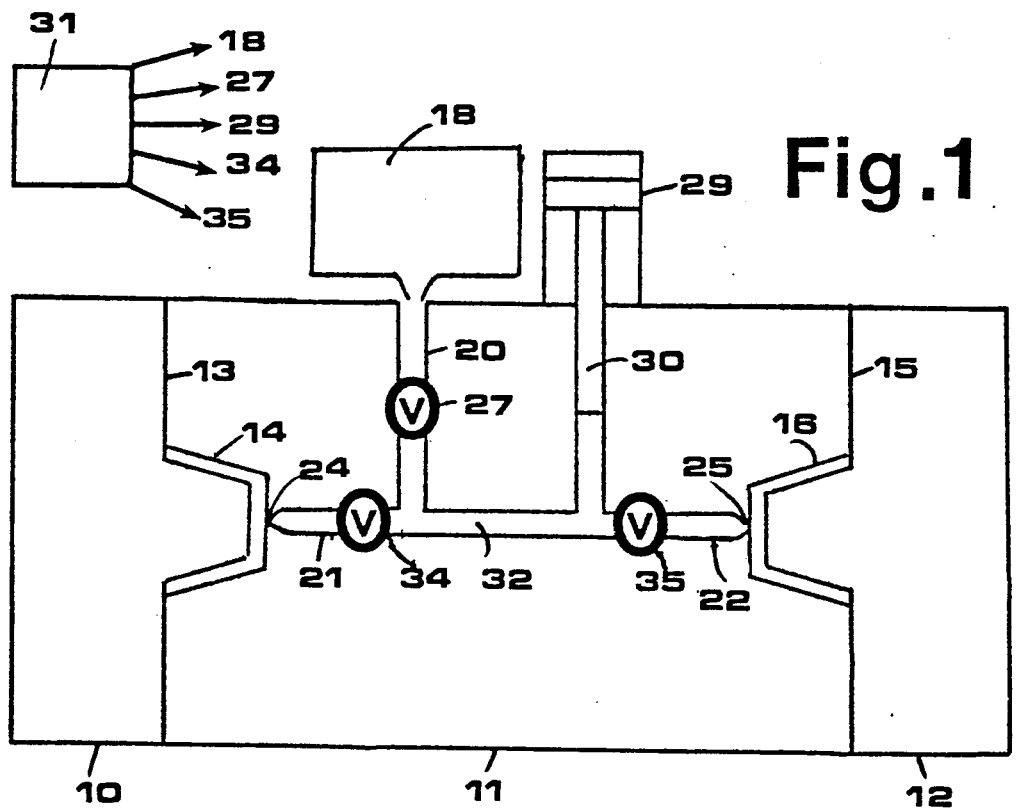
FIG. 1 illustrates one preferred embodiment of the hold pressure control system of the present invention in a stacked multi-parting injection molding system.

Referring to FIG. 1, a preferred embodiment of a stacked multi-parting injection molding system in which hold pressure is controlled according to the present invention includes a left molding block 10, a center molding block 11 and a right molding block 12. The center molding block 11 and the left molding block 10 join at a first parting surface 13 and define a left molding cavity 14. The center molding block 11 and the right molding block 12 join at a second parting surface 15 and define a right molding cavity 16. The center molding block 11 may include a center platen of a molding machine. An injection system 18 and the center molding block 11 define an adjustable feed system, which may have a molten core. Within the center molding block 11, the feed system includes a runner stem 20, which is connected to a left branch 21 and a right branch 22. The left branch 21 terminates in a gate 24 to the left molding cavity 14; and the right branch 22 terminates in a gate 25 to the right molding cavity 16. A first valve 27 in the runner stem 20 controls the flow of plastic material through the runner stem 20. The injection system 18 is disposed to inject plastic material into the runner stem 20. The injection system 18 may be separated from the remainder of the feed system when not being pressurized to inject the plastic material into the runner stem 20. The molding system has desynchronized injection periods. A piston system 29 including a packing element 30 is connected to the feed system for controlling the hold pressure in the left and right branches 21, 22. A controller 31 controls hold pressure in the molding system of FIG. 1 by controlling the operations of the injection system 18, the valve 27 and the piston system 29.

The method of controlling hold pressure by utilizing the embodiment of the invention illustrated in FIG. 1 includes the following steps:

(a) adjusting the feed system by opening the first valve 27 to enable plastic material 32 to be fed from the injection system 18 through the left branch 21 to the left molding cavity 14;

(b) pressurizing the injection system 18 to inject the plastic material 32 through the left branch 21 to fill the left molding cavity 14;

(c) shutting the first valve 27 to confine the plastic material 32 injected into the left branch 21 and the left molding cavity 14;

(d) hold pressurizing the plastic material 32 confined in the left branch 21 and the left molding cavity 14 by the first valve 27;

(e) adjusting the feed system by opening the first valve 27 to enable plastic material 32 to be fed from the injection system 18 through the right branch 22 to the right molding cavity 16;

(f) pressurizing the injection system 18 to inject the plastic material 32 through the right branch 22 to fill the right molding cavity 16;

(g) shutting the first valve 27 to confine the plastic material 32 injected into the right branch 22 and the right molding cavity 16; and (h) hold pressurizing the plastic material 32 confined in the right branch 22 and the right molding cavity 16 by the first valve 27. Steps (a) through (d) are performed in sequence; and steps (e) through (h) are performed in sequence. These two sequences (a)-(d) and (e)-(h) may be overlapping. Ejection of the product molded in the right molding cavity 16 may conveniently take place in the period after step (b) and before step (f); and ejection of the product molded in the left molding cavity 14 may conveniently take place in the period after step (f) and before step (b). Alternatively, ejection of both molded products may take place during the period after step (f) and before step (b).

Plasticization may commence immediately after step (b) and immediately after step (f) in order decrease the cycle time.

The system of FIG. 1 may further include two optional left and right valves 34 and 35. The operations of the valves 34 and 35 are controlled by the controller 31. The feed system may be further adjusted during step (a) by opening the left valve 34 and closing the right valve 35 to thereby enable the plastic material to flow into only the left molding cavity 14 during step (b). During step (e) the left valve 34 is closed and the right valve 35 is opened to thereby enable the plastic material to flow into only the right molding cavity during step (f). The optional valves 34 and 35 are not required in this embodiment when both steps (b) and (f) take place with both molding cavities 14, 16 closed, and the plastic material previously injected into one molding cavity provides resistance to further flow into such molding cavity and its adjacent branch while the plastic material is being injected into the other molding cavity. During initialization of the system, a previously molded product is placed in the one molding cavity to provide such resistance. The inclusion of the optional left and right valves 34, 35 allows hold pressure to be applied for a longer period because hold pressure can be continued to be applied to one molding cavity when the other molding cavity is opened.

Step (d) may further include the step of (i) further hold pressurizing the plastic material confined in the left molding cavity 14 by operating the piston system 29 to protract the packing element 30; and step (h) may further include the step of (j) further hold pressurizing the plastic material confined in the right molding cavity 16 by operating the piston system 29 to protract the packing element 30.

This method further includes the step of (k) depressurizing the feed system between the first valve 27 and the molding cavities 14, 16 by operating the piston system 27 to retract the packing element 30.

Figure 2:
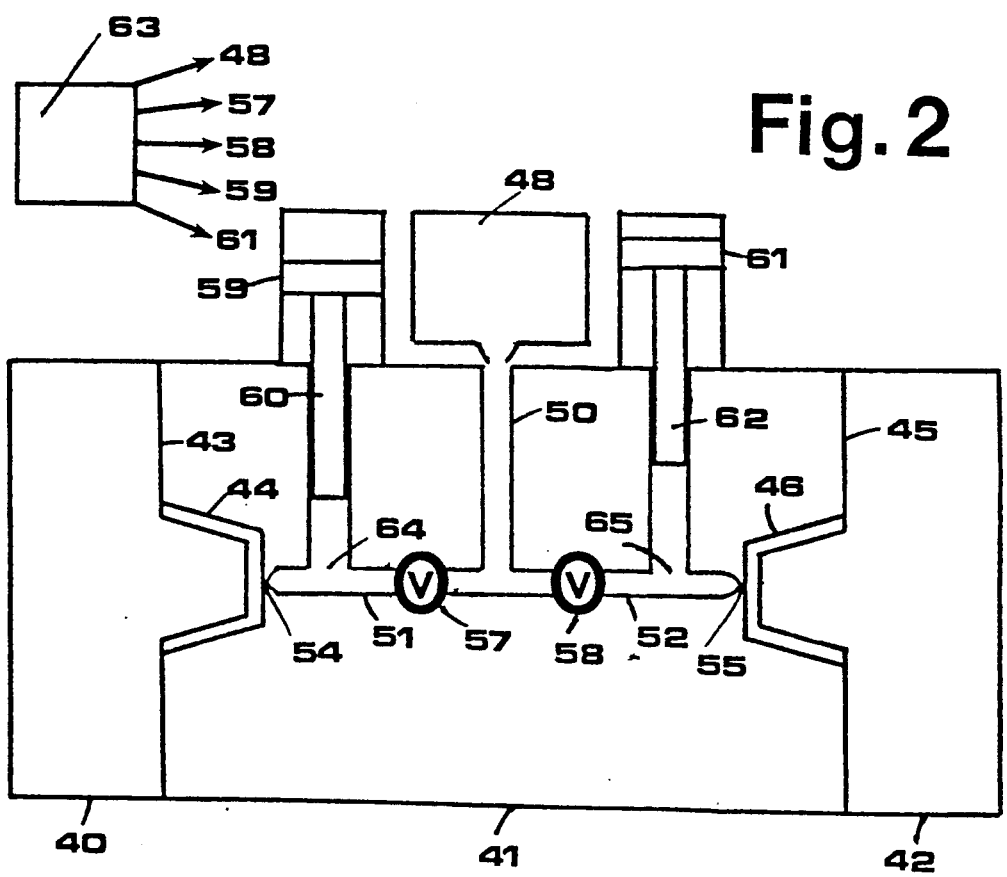
FIG. 2 illustrates an alternative preferred embodiment of the hold pressure control system of the present invention in a stacked multi-parting injection molding system.

Referring to FIG. 2, an alternative preferred embodiment of a stacked multi-parting molding system in which hold pressure is controlled according to the present invention includes a left molding block 40, a center molding block 41 and a right molding block 42. The center molding block 41 and the left molding block 40 join at a first parting surface 43 and define a left molding cavity 44. The center molding block 41 and the right molding block 42 join at a second parting surface 45 and define a right molding cavity 46. The center molding block 41 may include a center platen of a molding machine. An injection system 48 and the center molding block 41 define an adjustable feed system, which may have a molten core. Within the center molding block 41, the feed system includes a runner stem 50, which is connected to a left branch 51 and a right branch 52. The left branch 51 terminates in a gate 54 to the left molding cavity 44; and the right branch 52 terminates in a gate 55 to the right molding cavity 46. A first valve 57 in the left branch 51 controls the flow of plastic material through the left branch 51. A second valve 58 in the right branch 52 controls the flow of plastic material through the right branch 52. The injection system 48 is disposed to inject plastic material into the runner stem 50. The injection system 48 may be separated from the remainder of the feed system when not being pressurized to inject the plastic material into the runner stem 50. The molding system has desynchronized injection periods. A left piston system 59 including a left packing element 60 is connected to the left branch 51 for controlling the hold pressure in the left branch 51 and the left molding cavity 44. A right piston system 61 including a right packing element 62 is connected to the right branch 52 for controlling the hold pressure in the right branch and the right molding cavity 46. A controller 63 controls hold pressure in the molding system of FIG. 2 by controlling the operations of the injection system 48, the valves 57, 58 and the piston system 59, 61.

The method of controlling hold pressure by utilizing the embodiment of the invention illustrated in FIG. 2 includes the following steps:

(a) adjusting the feed system by opening the first valve 57 to enable plastic material 64 to be fed from the injection system 48 through the runner stem 50 and the left branch 51 to the left molding cavity 44;

(b) pressurizing the injection system 48 to inject the plastic material 64 through the left branch 51 to fill the left molding cavity 44;

(c) shutting the first valve 57 to confine the plastic material 64 injected into the left branch 51 and the left molding cavity 44;

(d) hold pressurizing the plastic material 64 confined in the left branch 51 and the left molding cavity 44 by the first valve 57;

(e) adjusting the feed system by opening the second valve 58 to enable plastic material 65 to be fed from the injection system 18 through the runner stem 50 and the right branch 52 to the right molding cavity 46;

(f) pressurizing the injection system 48 to inject the plastic material 65 through the right branch 52 to fill the right molding cavity 46;

(g) shutting the second valve 58 to confine the plastic material 65 injected into the right branch 52 and the right molding cavity 46; and (h) hold pressurizing the plastic material 65 confined in the right branch 52 and the right molding cavity 46 by the first valve 57. Steps (a) through (d) are performed in sequence; and steps (e) through (f) are performed in sequences. These two sequences (a)-(d) and (e)-(h) may be overlapping.

Step (d) may further include the step of (i) further hold pressurizing the plastic material 64 confined in the left molding cavity 44 by operating the left piston system 59 to protract the left packing element 60; and step (h) may further include the step of (j) further hold pressurizing the plastic material 65 confined in the right molding cavity 46 by operating the right piston system 61 to protract the right packing element 62.

This method further includes the steps of (k) depressurizing the left branch 51 between the first valve 57 and the left molding cavity 44 by operating the left piston system 59 to retract the left packing element 60; and (l) depressurizing the right between the second valve 58 and the right molding cavity 46 by operating the right piston system 61 to retract the right packing element 62.

Figure 3A:
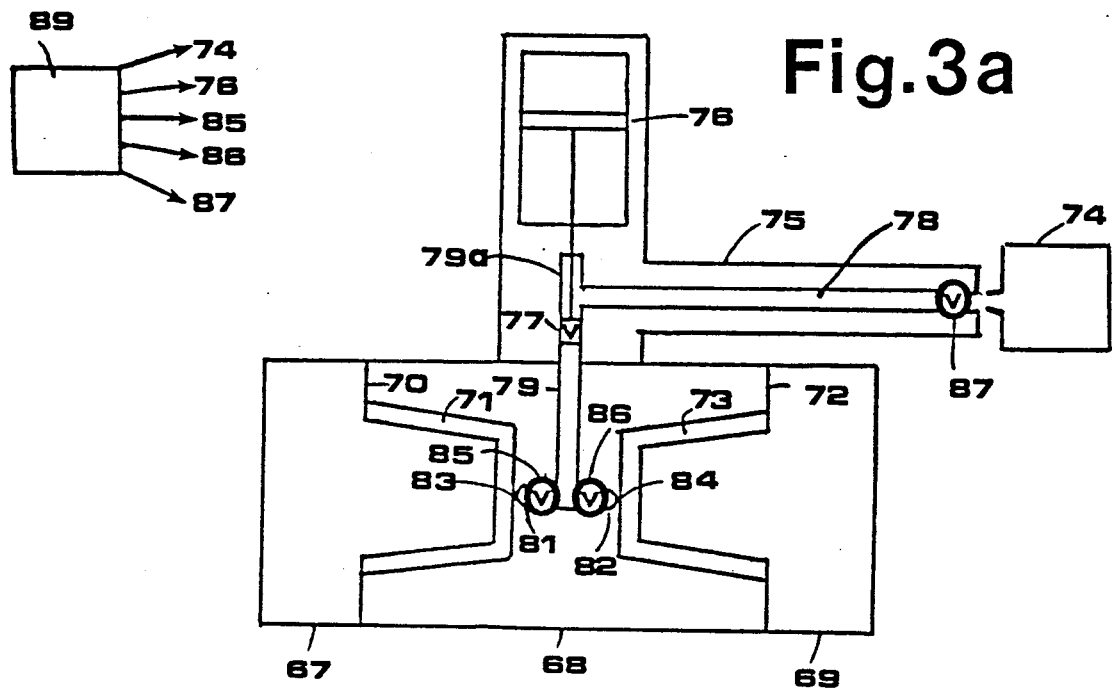
FIGS. 3A and 3B illustrate another alternative embodiment of the hold pressure control system of the present invention in a stacked multi-parting injection molding system, with FIG 3A showing both molding cavities closed, and FIG. 3B showing one molding cavity open.
Figure 3B:
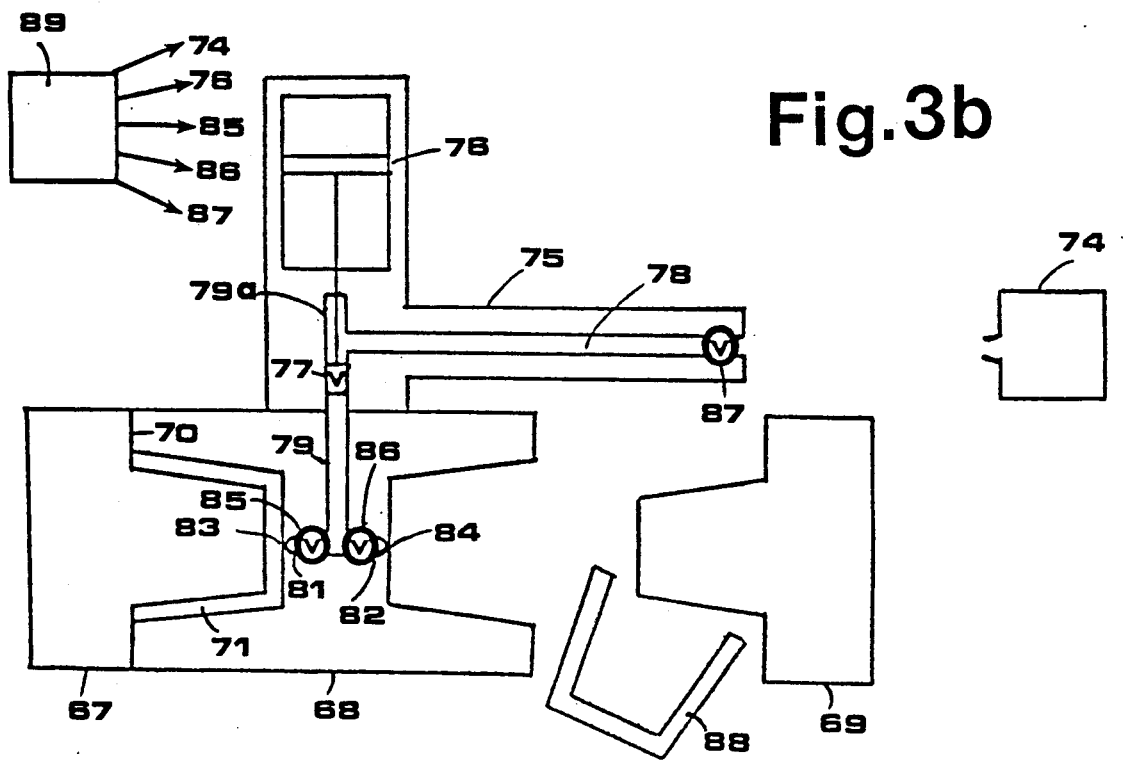

Referring to FIGS. 3A and 3B, another alternative preferred embodiment of a stacked multi-parting injection molding system in which hold pressure is controlled according to the present invention includes a left molding block 67, a center molding block 68 and a right molding block 69. The center molding block 68 and the left molding block 67 join at a first parting surface 70 and define a left molding cavity 71. The center molding block 68 and the right molding block 69 join at a second parting surface 72 and define a right molding cavity 73. The center molding block 68 may include a center platen of a molding machine. An injection system 74 and the center molding block 68 define an adjustable feed system, which may have a molten core. The center molding block 68 includes a snorkle unit 75 and a piston system 76. The piston system 76 includes a packing element 77. The packing element 77 includes a one-way valve that permits plastic material to flow only toward the molding cavities 71, 73. Within the center molding block 68, the feed system includes a horizontal runner stem 78 and a vertical runner stem 79 connected together at an angle. The vertical runner stem 79 extends in both directions from its juncture with the horizontal runner stem 78, and includes a recess 79a. The vertical runner stem 79 is connected to a left branch 81 and a right branch 82. The packing element 77 of the piston system is positioned within the vertical runner stem 79. When the piston system 76 is retracted, the packing element 77 is withdrawn into the recess 79a. When the piston system 76 is protracted the packing element 77 is protracted to a position within the vertical runner stem 79 between the horizontal runner stem 78 and the left and right branches 81, 82. Within the center molding block 68, the left branch 81 terminates in a gate 83 to the left molding cavity 71; and the right branch 82 terminates in a gate 84 to the right molding cavity 73. An optional first valve 85 in the left branch 81 controls the flow of plastic material through the left branch 81. An optional second valve 86 in the right branch 82 controls the flow of plastic material through the right branch 82. The injection system 74 is disposed to inject plastic material into the inlet stem 78 of the snorkle unit 75. An opening third valve 87 is disposed in the inlet stem 78 to prevent plastic material from leaking out of the horizontal runner stem 78. As shown in FIG. 3B, the injection system 74 may be separated from the remainder of the feed system when the right molding cavity 73 is opened to enable a product 88 to be ejected therefrom. The molding system of FIGS. 3A and 3B has desynchronized injection periods. A controller 89 controls the hold pressure control system of FIGS. 3A and 3B by controlling the operation of the injection system 74, the piston system 76, and the valves 85, 86, 87. In an alternative embodiment (not shown), the packing element 77 is a cylindrical piston instead of a one-way valve.

The method of controlling hold pressure by utilizing the embodiment of the invention illustrated in FIGS. 3A and 3B includes the following steps:

(a) adjusting the feed system by retracting the packing element 77 into the recess 79a and opening the first valve 85 and the third valve 87 to enable plastic material to be fed from the injection system 74 through the horizontal runner stem 78, the vertical runner stem 79 and the left branch 81 to the left molding cavity 71;

(b) pressurizing the injection system 74 to inject the plastic material through the horizontal runner stem 78, the vertical runner stem 79 and the left branch 81 to fill the left molding cavity 71;

(c) protracting the packing element 77 into that portion of the vertical runner stem 79 between the horizontal runner stem 78 and the left branch 81 to confine the plastic material injected into the left branch 81 and the left molding cavity 71;

(d) maintaining the packing element 77 in its protracted position and/or further protracting the packing element 77 to hold pressurize the plastic material confined in the left branch 81 and the left molding cavity 71 by the packing element 77;

(e) adjusting the feed system by retracting the packing element 77 into the recess 79a and opening the second valve 86 and the third valve 87 to enable plastic material to be fed from the injection system 74 through the horizontal runner stem 78, the vertical runner stem 79 and the right branch 82 to the right molding cavity 73;

(f) pressurizing the injection system 74 to inject the plastic material through the horizontal runner stem 78, the vertical runner stem 79 and the right branch 82 to fill the right molding cavity 73;

(g) protracting the packing element 77 into that portion of the vertical runner stem 79 between the horizontal runner stem 78 and the right branch 82 to confine the plastic material injected into the right branch 82 and the right molding cavity 73; and (h) maintaining the packing element 77 in its protracted position and/or further protracting the packing element 77 to hold pressurize the plastic material confined in the right branch 82 and the right molding cavity 73 by the packing element 77.

Steps (c) and (d) may be performed while the right molding cavity 73 is opened as shown in FIG. 3B. Likewise, steps (g) and (h) may be performed while the left molding cavity 71 is opened.

The first valve 85 may be closed during steps (e) and (f); and the second valve 86 may be closed during steps (a) and (b).

Steps (a) through (d) are performed in sequence; and steps (e) through (h) are performed in sequence. These two sequences may be overlapping.

This method further includes the steps of (i) depressurizing the left branch 81 between the packing element 77 and the left molding cavity 71 by operating the piston system 76 to retract the packing element 77; and (j) depressurizing the right branch 82 between the packing element 77 and the right molding cavity 73 by operating the piston system 76 to retract the packing element 77.

Figure 4:
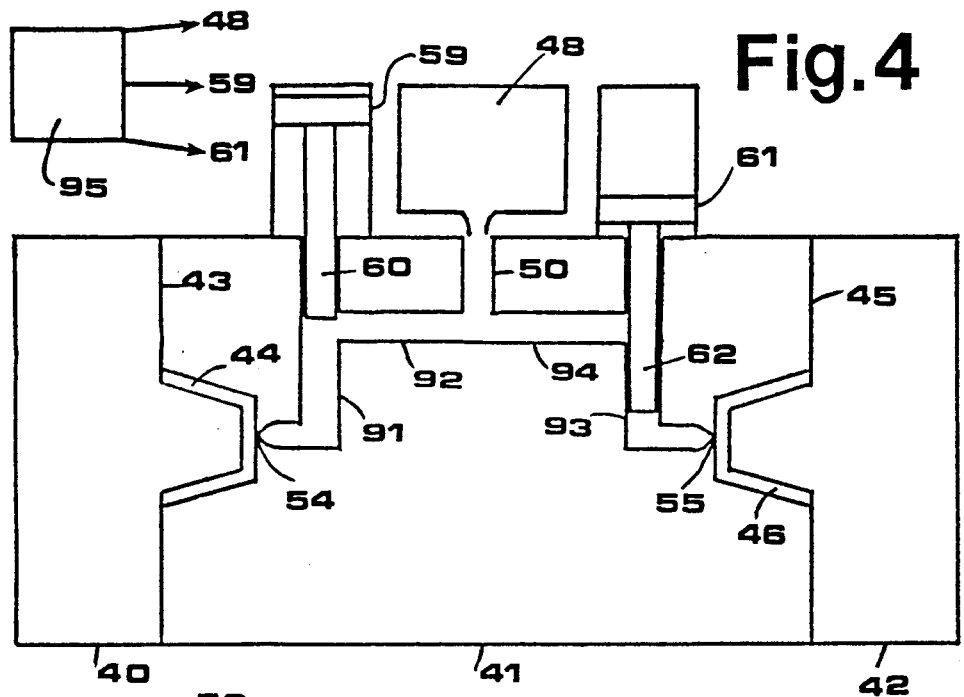
FIG. 4 illustrates still another alternative embodiment of the hold pressure control system of the present invention in a stacked multi-parting injection molding system.

Referring to FIG. 4, still another alternative preferred embodiment of the hold pressure control system of the present invention is a variation of the system described above with reference to FIG. 2. Common reference numerals are used to describe the common elements of these two systems. This embodiment is a stacked multi-parting molding system including a left molding block 40, a center molding block 41 and a right molding block 42. The center molding block 41 and the left molding block 40 join at a first parting surface 43 and define a left molding cavity 44. The center molding block 41 and the right molding block 42 join at a second parting surface 45 and define a right molding cavity 46. The center molding block 41 may be either a center platen of a molding machine. An injection system 48 and the center molding block 41 define an adjustable feed system, which may have a molten core. Within the center molding block 41, the feed system includes a runner stem 50, which is connected to a left branch and a right branch. The left branch includes a vertical portion 91 and a horizontal portion 92. The vertical portion 91 of the left branch extends in both directions from its juncture with the horizontal portion 92 of the left branch. The right branch includes a vertical portion 93 and a horizontal portion 94. The vertical portion 93 of the right branch extends in both directions from its juncture with the horizontal portion 94 of the right branch.

A left piston system 59 including a left packing element 60 is connected to the vertical portion 91 of the left branch for controlling the hold pressure in the left branch and the left molding cavity 44. A right piston system 61 including a right packing element 62 is connected to the vertical portion 93 of the right branch for controlling the hold pressure in the right branch and the right molding cavity 46. The packing elements 60, 62 are cylindrical pistons and do not include any valves. The packing element 60 of the piston system 59 is positioned for movement within the vertical portion 91 of the left branch. When the piston system 59 is retracted the packing element 60 is withdrawn to open the juncture between the vertical 91 and horizontal 92 portions of left branch. When the piston system 59 is protracted the packing element 60 blocks the flow of plastic material through the vertical portion 91 of the left branch from the horizontal portion 92 of the left branch. The packing element 62 of the piston system 61 is positioned for movement within the vertical portion 93 of the right branch. When the piston system 61 is retracted the packing element 62 is withdrawn to open the juncture between the vertical 93 and horizontal 94 portions of the right branch. When the piston system 61 is protracted the packing element 62 blocks the flow of plastic material through the vertical portion 93 of the right branch from the horizontal portion 94 of the right branch. The left branch terminates in a gate 54 to the left molding cavity 44; and the right branch terminates in a gate 55 to the right molding cavity 46. The injection system 48 is disposed to inject plastic material into the runner stem 50. The injection system 48 may be separated from the remainder of the feed system when not being pressurized to inject the plastic material into the runner stem 50. The molding system has desynchronized injection periods. A controller 95 controls the hold pressure control system of FIG. 4 by controlling the operation of the injection system 48, the left piston system 59 and the right piston system 61. The hold pressure control system of FIG. 4 does not require valves in the feed system.

The method of controlling hold pressure by utilizing the embodiment of the invention illustrated in FIG. 4 includes the following steps:

(a) adjusting the feed system by retracting the left packing element 60 to enable plastic material to be feed from the injection system 48 through the runner stem 50, and the horizontal 92 and vertical 91 portions of the left branch to the left molding cavity 44;

(b) pressurizing the injection system 48 to inject the plastic material through the runner stem 50, and the horizontal 92 and vertical 91 portions of the left branch to fill the left molding cavity 44;

(c) protracting the left packing element 60 into the vertical portion 91 of the left branch between the horizontal portion 92 of the left branch and the left molding cavity 44 to confine the plastic material injected into the vertical portion of the left branch and the left molding cavity 44;

(d) maintaining the left packing element 60 in its protracted position and/or further protracting the left packing element 60 to hold pressurize the plastic material confined in the vertical portion 91 of left branch and the left molding cavity 44 by the packing element 60;

(e) adjusting the feed system by retracting the right packing element 62 to enable plastic material to be fed from the injection system 48 through the runner stem 50, and the horizontal 94 and vertical 93 portions of the right branch to the right molding cavity 46;

(f) pressurizing the injection system 48 to inject the plastic material through the runner stem 50, and the horizontal 94 and vertical 93 portions of the right branch to fill the right molding cavity 46;

(g) protracting the right packing element 62 into the vertical portion 93 of the right branch between the horizontal portion 94 of the right branch and the right molding cavity 46 to confine the plastic material injected into the right branch and the right molding cavity 46; and (h) maintaining the right packing element 62 in its protracted position and/or further protracting the right packing element 62 to hold pressurize the plastic material confined in the right branch and the right molding cavity 44 of the right packing element 62.

This method further includes the steps of (i) depressurizing the vertical portion 91 of the left branch between the left packing element 60 and the left molding cavity 44 by operating the left piston system 59 to retract the left packing element 60; and (l) depressurizing the vertical portion 93 of right branch between the right packing element 62 and the right molding cavity 46 by operating the right piston system 61 to retract the right packing element 62.

Steps (a) through (d) are performed in sequence; and steps (e) through (h) are performed in sequence. These two sequences may be overlapping.

Figure 5:
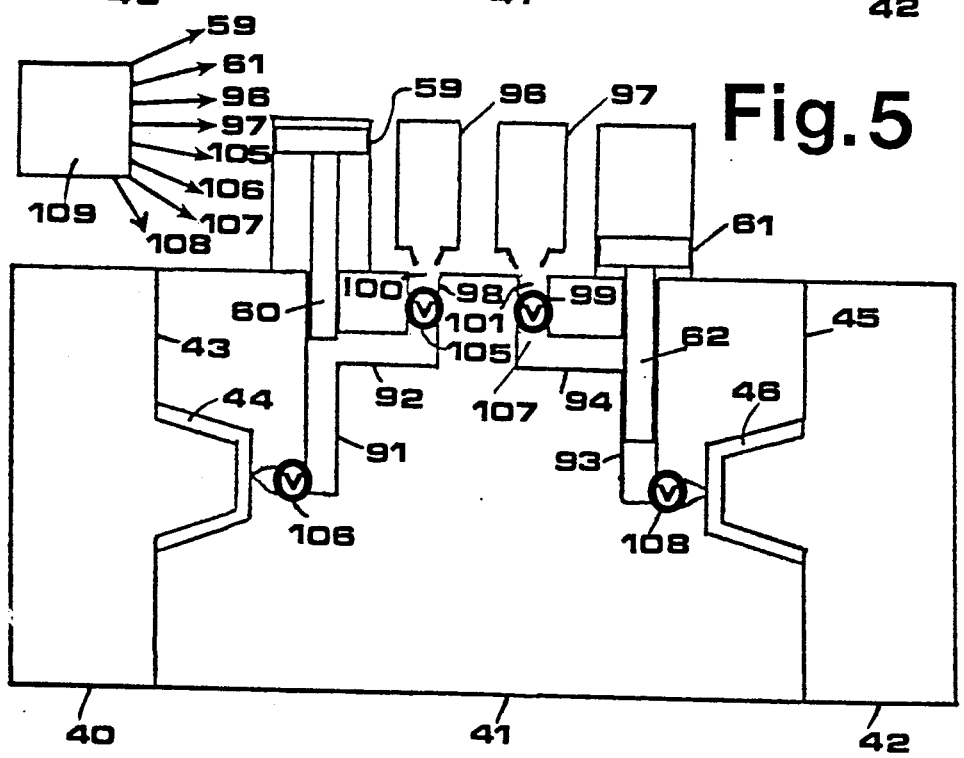
FIG. 5 illustrates a further alternative embodiment of the hold pressure control system of the present invention in a stacked multi-parting injection molding system.

Referring to FIG. 5, a further alternative preferred embodiment of the hold pressure control system of the present invention is a variation of the system described above with reference to FIG. 4. Common reference numerals are used to describe the common elements of these two systems. This embodiment is a stacked multi-parting molding system including a left molding block 40, a center molding block 41 and a right molding block 42. The center molding block 41 and the left molding block 40 join at a first parting surface 43 and define a left molding cavity 44. The center molding block 41 and the right molding block 42 join at a second parting surface 45 and define a right molding cavity 46. The center molding block 41 may be either a center platen of a molding machine. An injection system including a left injection unit 96 and a right injection unit 97 and the center molding block 41 define an adjustable feed system, which may have a molten core. Within the center molding block 41, the feed system includes a left runner stem 98, which is connected to a left branch, and a right runner stem 99, which is connected to a right branch. The left branch includes a vertical portion 91 and a horizontal portion 92. The vertical portion 91 of the left branch extends in both directions from its juncture with the horizontal portion 92 of the left branch. The right branch includes a vertical portion 93 and a horizontal portion 94. The vertical portion 93 of the right branch extends in both directions from its juncture with the horizontal portion 94 of the right branch.

Figure 5A:
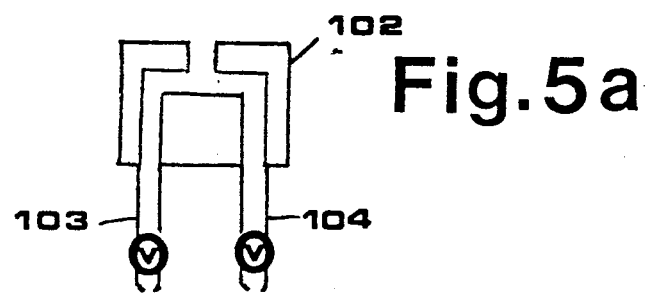
FIG. 5A illustrates a modified injection system for the hold pressure control system illustrated in FIG. 5.

The left runner stem 98 includes an orifice 100 for receiving plastic material from the left injection unit 96; and the right runner stem 99 includes an orifice 101 for receiving plastic material from the right injection unit 97. Alternatively, the system includes only a single injection unit 96, which is moved back and forth between the left and right injection orifices 100, 102 for injecting plastic material into the respective left and right runner stems 98, 99. In another alternative embodiment, as shown in FIG. 5A, the injection system includes a single injection unit 102 having two injection nozzles 103, 104 for injecting plastic material into the respective left and right injection orifices 100, 101. A first valve 105 is located in the left runner stem 98 and a second valve 106 is located in the left branch 91. A third valve 107 is located in the right runner stem 99 and fourth valve 108 is located in the right branch 93.

A left piston system 59 including a left packing element 60 is connected to the vertical portion 91 of the left branch for controlling the hold pressure in the left branch and the left molding cavity 44. A right piston system 61 including a right packing element 62 is connected to the vertical portion 93 of the right branch for controlling the hold pressure in the right branch and the right molding cavity 46. The packing elements 60, 62 are cylindrical pistons and do not include any valves. The packing element 60 of the piston system 59 is positioned for movement within the vertical portion 91 of the left branch. When the piston system 59 is retracted the packing element 60 is withdrawn to open the juncture between the vertical 91 and horizontal 92 portions of left branch. When the piston system 59 is protracted the packing element 60 blocks the flow of plastic material through the vertical portion 91 of the left branch from the horizontal portion 92 of the left branch. The packing element 62 of the piston system 61 is positioned for movement within the vertical portion 93 of the right branch. When the piston system 61 is retracted the packing element 62 is withdrawn to open the juncture between the vertical 93 and horizontal 94 portions of the right branch. When the piston system 61 is protracted the packing element 62 blocks the flow of plastic material through the vertical portion 93 of the right branch from the horizontal portion 94 of the right branch. The left branch terminates in a gate 54 to the left molding cavity 44; and the right branch terminates in a gate 55 to the right molding cavity 46. The molding system has desynchronized injection periods. A controller 109 controls the hold pressure control system of FIG. 5 by controlling the operation of the left and right injection units 96, 97, the left piston system 59, the right piston system 61, and the valves 105, 106, 107 and 108.

The method of controlling hold pressure by utilizing the embodiment of the invention illustrated in FIG. 5 includes the following steps:

(a) adjusting the feed system by retracting the left packing element 60 and opening the valves 105 and 106 to enable plastic material to be fed from the left injection unit 96 through the left runner stem 98, and the horizontal 92 and vertical 91 portions of the left branch to the left molding cavity 44;

(b) pressurizing the left injection unit 96 to inject the plastic material through the left runner stem 98, and the horizontal 92 and vertical 91 portions of the left branch to fill the left molding cavity 44;

(c) protracting the left packing element 60 into the vertical portion 91 of the left branch between the horizontal portion 92 of the left branch and the left molding cavity 44 to confine the plastic material injected into the vertical portion 91 of the left branch and the left molding cavity 44;

(d) maintaining the left packing element 60 in its protracted position and/or further protracting the left packing element 60 to hold pressurize the plastic material confined in the vertical portion 91 of the left branch and the left molding cavity 44 by the packing element 60;

(e) adjusting the feed system by retracting the right packing element 62 and opening the valves 107 and 108 to enable plastic material to be fed from the right injection unit 97 through the right runner stem 99, and the horizontal 94 and vertical 93 portions of the right branch to the right molding cavity 46;

(f) pressurizing the right injection unit 97 to inject the plastic material through the right runner stem 99, and the horizontal 94 and vertical 93 portions of the right branch to fill the right molding cavity 46;

(g) protracting the right packing element 62 into the vertical portion 93 of the right branch between the horizontal portion 94 of the right branch and the right molding cavity 46 to confine the plastic material injected into the right branch and the right molding cavity 46; and (h) maintaining the right packing element 62 in its protracted position and/or further protracting the right packing element 62 to hold pressurize the plastic material confined in the right branch and the right molding cavity 44 of the right packing element 62.

This method further includes the steps of (i) depressurizing the vertical portion 91 of left branch between the left packing element 60 and the left molding cavity 44 by operating the left piston system 59 to retract the left packing element 60; and (l) depressurizing the vertical portion 93 of right branch between the right packing element 62 and the right molding cavity 46 by operating the right piston system 61 to retract the right packing element 62.

The first and second valves 105, 106 may be closed during steps (e) and (f); and the third and fourth valves 107, 108 may be closed during steps (a) and (b). The valves 105, 106, 107 and 108 are optional since the left and right branches may be depressurized to prevent leakage as described above.

Steps (a) through (d) are performed in sequence; and steps (e) through (h) are performed in sequence. These two sequences may be overlapping.

It is usually desirable to provide a high injection pressure at the gate to a molding cavity immediately as the injection is started. But due to the feed system of a multi-parting injection molding system tending to be rather long in distance, and hot molten plastic material being quite compressible, such high injection pressure at the gate is difficult to obtain. It should be noted that the piston systems of the system and method of the present invention may be used to increase initial pressure at the gate at the beginning of injection.

The piston systems in the embodiments described above may be hydraulic, as shown, or may be electrically or spring powered. The valves in the embodiments described above may be rotary or multidependent. Alternatively the valve function may be provided ultrasonically or by heat impulse to the plastic material at the gate. Also the different types of confining systems described herein may be used interchangeably.

Figure 6:
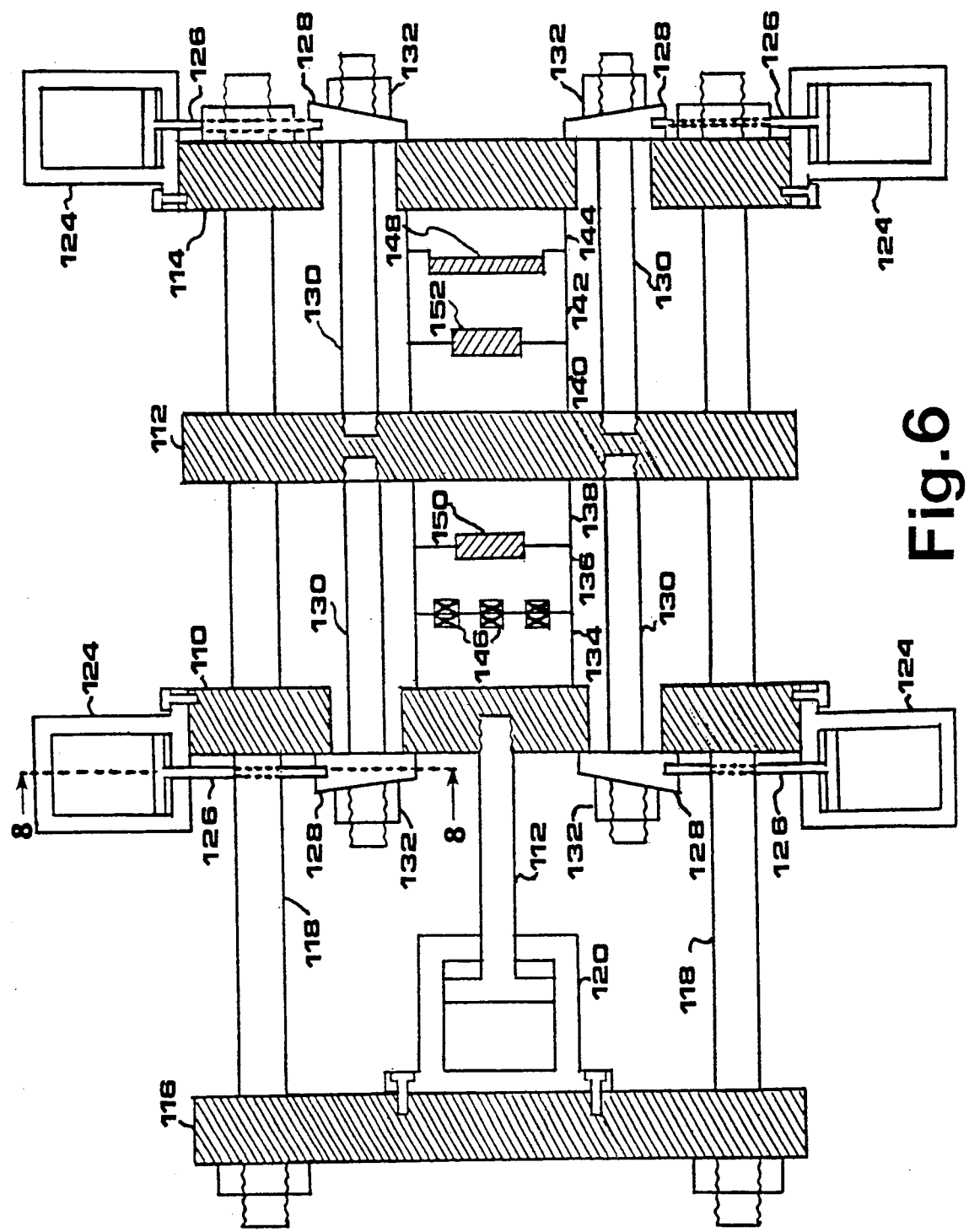
FIG. 6 is a side view illustrating a preferred embodiment of the axial clamping system of the present invention in a stacked multi-parting molding system with both molding cavities in closed positions.
Figure 7:
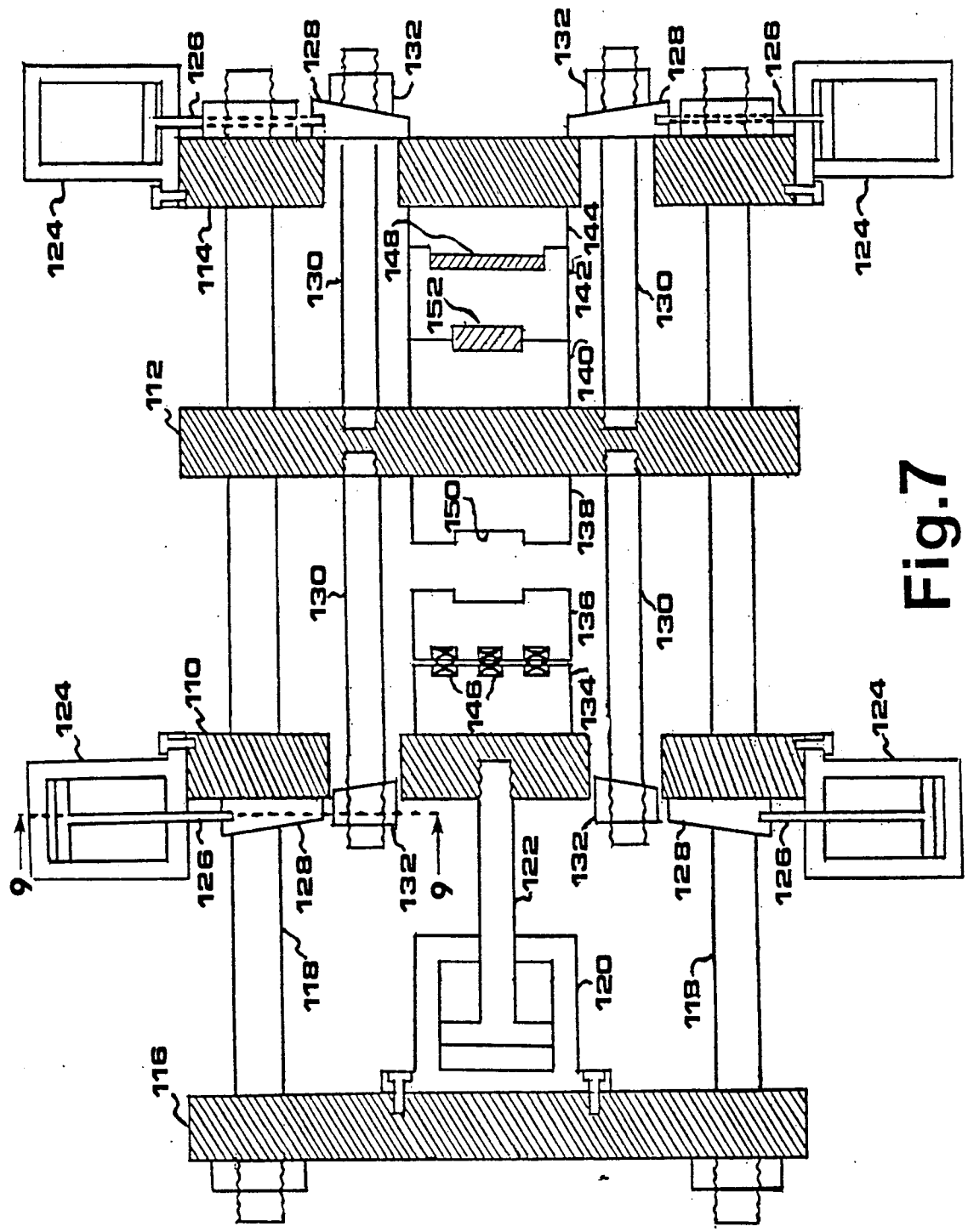
FIG. 7 is a side view illustrating the molding system of FIG. 6, with one molding cavity in an open position and the other molding cavity locked in a closed position.

Referring to FIGS. 6 and 7, a preferred embodiment of the multi-parting molding system of the present invention includes a left platen 110, a center platen 112, a right platen 114, a base block 116, positioning bars 118, and a hydraulic positioning mechanism containing a cylinder 120, a rod 122, a plurality of locking mechanisms, each including a hydraulic cylinder 124, a rod 126, a wedge-shaped locking plate 128, a locking bar 130 and a wedge-shaped nut 132; mold parts 134, 136, 138, 140, 142 and 144; a plurality of springs 46 and a hydraulic cylinder 148. The combination of the center platen 112 and the mold parts 138, 140 form a center molding block in a stacked molding system and may be adapted to include the different embodiments of the hold pressure control system of the present invention described herein with reference to FIGS. 1 through 5A.

The right platen 114 and the base block 116 are stationary, and are connected by the positioning bars 118. The left and center platens 110, 112 are supported by the bars 118 between the base block 116 and the right platen 114 for lateral movement in directions toward and away from the right platen 114 and the base block 116. The cylinder 120 of the hydraulic positioning mechanism is attached to the base block 116, and the rod 122 of the hydraulic positioning mechanism is attached to the left platen 110.

For each of the plurality of locking mechanisms, the cylinder 124 is attached to the left or right platen 110 or 114, the rod 126 moves in the cylinder 124 and is connected to the locking plate 128; one end of the bar 130 is secured to the center platen 112; and the nut 132 is fastened to the other end of the bar 130. The other end of the bar 130 is threaded so that the position of the nut 132 may be adjusted.

A left molding block includes the left platen 110 and mold parts 134 and 136. A center molding block includes the center platen 112 and mold parts 138 and 140. A right molding block includes the right platen 114 and mold parts 142 and 144. A left molding cavity 150 is defined by the mold parts 136 and 138; and a right molding cavity 152 is defined by the mold parts 140 and 142.

To close both the left molding cavity 150 and the right molding cavity 152, the rod 122 of the hydraulic positioning mechanism is protracted, as shown in FIG. 6. The amount of axial clamping force applied to the left and right mold cavities 150, 152 can be controlled by controlling the amount of protraction of the rod 122 of the hydraulic positioning mechanism. To open the molding cavities 150, 152, the hydraulic positioning mechanism is operated to retract the rod 122. When both molding cavities 150, 152 are closed the locking mechanisms are operated to lock both molding cavities 150, 152 the closed position, as shown in FIG. 6. To lock a molding cavity (for example, the left molding cavity 150) in a closed position, the rod 126 is protracted to wedge the locking plate 128 between the nut 132 and the left platen 110, as shown in FIGS. 7 and 9. To open the left molding cavity 150, the rod 126 is retracted to remove the locking plate 128 from between the nut 132 and the left platen 110, as shown in FIGS. 7 and 9.

When one of the two molding cavities 150, 152 is opened at a time when it is desired to maintain the other molding cavity in a closed position, it is necessary to lock the other molding cavity in the closed position. Thus, when the left molding cavity 150 is opened, as shown in FIG. 7, the locking mechanisms attached to the left platen 110 are operated to unlock the left platen 110 from the bars 130. The locking mechanisms attached to the right platen 114 remain in their locked position. The hydraulic positioning mechanism is then operated to retract the rod 122 and thereby move the left platen 110 to the left, which results in the opening of the left molding cavity 150. Since the locking mechanisms attached to the right platen 114 remain in their locked position, the center platen 112 remains attached to the right platen 114 and resists movement when the rod 122 is retracted to move the left platen 110 and open the left molding cavity 150. Thus the right molding cavity 152 remains closed when the left molding cavity 150 is opened. It will be readily apparent that by a reverse operation of the locking mechanisms, the left molding cavity 150 can be maintained in a locked position while the right molding cavity 152 is opened.

When the axial clamping force applied by the positioning mechanism 118, 120, 122 is removed from the right molding cavity 152 as a result of the retraction of the rod 122, with the right molding cavity being maintained in a closed position, as shown in FIG. 7, axial clamping force in addition to that provided by the locking plates 128 is applied to the right molding cavity 152 by expanding the right molding block in response to hydraulic pressure applied within the hydraulic cylinder 148 within the right molding block. The amount of the clamping force applied within the right molding block can be actively controlled by controlling the hydraulic pressure within the hydraulic cylinder 148.

When the clamping force applied by the positioning mechanism 118, 120, 122 is removed from the left molding cavity 150 as a result of the retraction of the rod 122, with the left molding cavity being maintained in a closed position (not shown), axial clamping force in addition to those provided by the locking plates 128 is applied to the left molding cavity 150 by expanding the left molding block in response to spring pressure passively applied by the springs 146 within the left molding block. The springs 146 preferably are parabolic steel washers, which are sometimes referred to as Belleville washers. The springs 146 are compressed by the clamping force applied by the positioning mechanism when the rod 22 is protracted, and expand within the left molding block when the rod 122 is retracted.

In other preferred embodiments, both the left molding block and the right molding block may contain the same type of expanding means, whether passive expanding means, such as the springs 146, or controllable expanding means, such as the hydraulic cylinder 148.

Other variations may be made in the preferred embodiment shown herein without departing from the present invention. For example, the locking plates 128 and the nuts 132 need not be wedge shaped; the clamping means, such as the springs 146 and/or the hydraulic cylinder 148, may be located apart from rather than within the molding blocks; and each of the left and right molding blocks may be of integral construction without necessarily including platens; and the positioning mechanism may be a tuggle system rather than the hydraulic mechanism 120, 122.

In an embodiment (not shown) utilizing a tuggle system for the positioning mechanism and controllable expanding means, such as the hydraulic cylinder 148, the total axial clamping force provided by the tuggle system and the hydraulic cylinder 148 is controlled by controlling the amount of hydraulic pressure applied within the hydraulic cylinder 148.

The hold pressure control systems and clamping systems of the present invention are particularly compatible with the various desynchronized molding cycles described in the aforementioned U.S. Pat. Nos. 4,400,431, 4,464,327 and 4,539,171.

I claim:

1. A method of controlling hold pressure applied to molding cavities of a stacked multi-parting injection molding system having desynchronized injection periods, including left, center and right molding blocks disposed for movement with respect to each other along a common axis and defining a left molding cavity between the center and left molding blocks and a right molding cavity between the center and right molding blocks, when cyclic injection molding a plastic material by utilizing a combination of the center block and an injection system which together encompass an adjustable feed system that is separated during the molding cycle by the injection system being separated from the center block, the feed system having within the center block a left branch for feeding the left molding cavity, a right branch for feeding the right molding cavity, and means for confining injected plastic material in the respective branches and molding cavities, the method comprising the cyclic steps of (a) adjusting the feed system to enable plastic material to be fed from the injection system through the left branch to the left molding cavity;
  (b) pressurizing the injection system to inject the plastic material through the left branch to fill the left molding cavity;
  (c) confining the plastic material injected into the left branch and the left molding cavity;
  (d) hold pressurizing the plastic material confined in the left branch and the left molding cavity;
  (e) adjusting the feed system to enable plastic material to be fed from the injection system through the right branch to the right molding cavity;
  (f) pressurizing the injection system to inject the plastic material through the right branch to fill the right molding cavity;
  (g) confining the plastic material injected into the right branch and the right molding cavity;
  (h) hold pressurizing the plastic material confined in the right branch and the right molding cavity; and
  (i) separating the injection system from the center block at a time when the injection system is not being pressurized in accordance with step (b) or step (f).

2. A method according to claim 1, wherein the molding system further includes movable packing means in the center block for hold pressurizing the plastic material confined in the respective branches and molding cavities,
  wherein step (d) further comprises the step of
  (j) moving the packing means to further hold pressurize the plastic material confined in the left branch and the left molding cavity; and
  wherein step (h) further comprises the step of
  (k) moving the packing means to further hold pressurize the plastic material confined in the right branch and the right molding cavity.

3. A method according to claim 1, wherein the molding system further includes movable packing means in the center block for hold pressurizing the plastic material confined in the left branch and left molding cavity,
  wherein step (d) further comprises the step of
  (j) moving the packing means to further hold pressurize the plastic material confined in the left branch and the left molding cavity.

4. A method according to claim 1, wherein the molding system further includes left and right movable packing means in the center block respectively coupled to the left and right branches,
  wherein step (d) further comprises the step of
  (j) moving the left packing means to further hold pressurize the plastic material confined in the left branch and the left molding cavity; and
  wherein step (h) further comprises the step of
  (k) moving the right packing means to further hold pressurize the plastic material confined in the right branch and the right molding cavity.

5. A method according to claim 1, wherein the left and right branches include left and right injection orifices respectively for receiving plastic material from a single injection unit, the method further comprising the steps of
  (j) moving the injection unit to the left orifice for injecting plastic material into the left branch; and
  (k) moving the injection unit to the right orifice for injecting plastic material into the right branch.

6. A method according to claim 1, wherein the injection system includes left and right orifices, and wherein the left and right branches include left and right injection orifices respectively for receiving plastic material from the injection system, the method further comprising the steps of
  (j) injecting plastic material into the left branch from the left orifice of the injection system; and
  (k) injecting plastic material into the right branch from the right orifice of the injection system.

7. A method according to claim 1, wherein the injection system includes a single injection unit having left and right orifices, and wherein the left and right branches include left and right injection orifices respectively for receiving plastic material from the injection system,
  wherein step (b) comprises the step of
  (j) injecting plastic material into the left branch from the left orifice of the injection unit; and
  wherein step (f) comprises the step of
  (k) injecting plastic material into the right branch from the right orifice of the injection unit.

8. A method of controlling hold pressure applied to mold cavities of a stacked multi-parting injection molding system having desynchronized injection periods, including a left, center and right molding blocks disposed for movement with respect to each other along a common axis and defining a left molding cavity between the center and left molding blocks and a right molding cavity between the center and right molding blocks, when cyclic injection molding a plastic material by utilizing a combination of the center block and an injection system which together encompass an adjustable feed system having within the center block a left branch for feeding the left molding cavity, a right branch for feeding the right molding cavity, and means for confining injected plastic material in the respective branches and molding cavities, the method comprising the cyclic steps of (a) adjusting the feed system to enable plastic material to be fed from the injection system through the left branch to the left molding cavity;
  (b) pressurizing the injection system to inject the plastic material through the left branch to fill the left molding cavity;
  (c) confining the plastic material injected into the left branch and the left molding cavity;
  (d) hold pressurizing the injected plastic material confined in the left branch and the left molding cavity;
  (e) adjusting the feed system to enable plastic material to be fed from the injection system through the right branch to the right molding cavity;
  (f) pressurizing the injection system to inject the plastic material through the right branch to fill the right molding cavity;

(g) confining the plastic material injected into the right branch and the right molding cavity; and (h) hold pressurizing the injected plastic material confined in the right branch and the right molding cavity;

wherein the confining means are movable;

wherein step (d) comprises the step of (i) moving the confining means to further hold pressurize the plastic material confined in the left branch and the left molding cavity;

wherein the portion of the feed system within the center block further includes a runner stem that divides into the left and right branches for feeding plastic material from the injection system to the left and right branches, and wherein the movable confining means are located within the runner stem; and wherein step (i) comprises moving the confining means within the stem to further hold pressurize the plastic material confined in the left branch and the left molding cavity.

9. A method according to claim 8, wherein step (h) comprises the step of (j) moving the confining means within the stem to further hold pressurize the plastic material confined in the right branch and the right molding cavity.

10. A method of applying hold pressure in a stacked multi-parting injection molding system that includes a center block and left and right end blocks disposed for movement with respect to each other along a common axis and defining a left molding cavity between the center and left blocks and a right molding cavity between the center block and right blocks, when cyclic injection molding a plastic material by utilizing an adjustable feed system that includes a runner stem for receiving injected plastic material from a pressurized injection system, a left branch for feeding the injected plastic material from the runner stem to the left molding cavity and a right branch for feeding the injected plastic material from the runner stem to the right molding cavity; confining means in the runner stem for confining injected plastic material within the feed system; and a common movable packing means in the center block connected to the feed system between the confining means and the left and right molding cavities which enables hold pressure to be applied simultaneously to plastic material withheld in the left and right branches of the feed system, the method comprising the steps of (a) adjusting the feed system to enable plastic material to be fed from the injection system through the left branch to the left molding cavity;

(b) pressurizing the injection system to inject the plastic material through the left branch to fill the left molding cavity;

(c) confining the plastic material injected into the left branch and the left molding cavity;

(d) moving the common packing means to hold pressurize the injected plastic material confined in the left branch and the left molding cavity;

(e) adjusting the feed system to enable plastic material to be fed from the injection system through the right branch to the right molding cavity;

(f) pressurizing the injection system to inject the plastic material through the right branch to fill the right molding cavity;

(g) confining the plastic material injected into the right branch and the right molding cavity; and (h) moving the common packing means to hold pressurize the injected plastic material confined in the right branch and the right molding cavity.

11. A method of controlling hold pressure applied to molding cavities of a stacked multi-parting injection molding system having desynchronized injection periods, including left, center and right molding blocks disposed for movement with respect to each other along a common axis and defining a left molding cavity between the center and left molding blocks and a right molding cavity between the center and right molding blocks, when cyclic injection molding a plastic material by utilizing a combination of the center block and an injection system which together encompass an adjustable feed system having within the center block a left branch for feeding the left molding cavity, a right branch for feeding the right molding cavity, and means for confining injected plastic material in the respective branches and molding cavities, wherein the molding cavities have desynchronous opening periods, the method comprising the cyclic steps of (a) adjusting the feed system to enable plastic material to be fed from the injection system through the left branch to the left molding cavity;

(b) pressurizing the injection system to inject the plastic material through the left branch to fill the left molding cavity;

(c) confining the plastic material injected into the left branch and the left molding cavity;

(d) hold pressurizing the plastic material confined in the left branch and the left molding cavity;

(e) adjusting the feed system to enable plastic material to be fed from the injection system through the right branch to the right molding cavity;

(f) pressurizing the injection system to inject the plastic material through the right branch to fill the right molding cavity;

(g) confining the plastic material injected into the right branch and the right molding cavity;

(h) hold pressurizing the plastic material confined in the right branch and the right molding cavity;

(i) locking one of the molding cavities to maintain it in a closed position while hold pressure is being applied thereto and while the other molding cavity is open; and (j) applying axial clamping force to the locked molding cavity by expanding the thickness of at least one of the molding blocks that defines the locked molding cavity.

12. An apparatus for controlling hold pressure applied to molding cavities of a stacked multi-parting injection molding system having desynchronized injection periods, including left, center and right molding blocks disposed for movement with respect to each other along a common axis and defining a left molding cavity between the center and left molding blocks and a right molding cavity between the center and right molding blocks, when cyclic injection molding a plastic material by utilizing a combination of the center block and an injection system which together encompass an adjustable feed system that is separated during the molding cycle by the injection system being separated from the center block, the feed system having within the center block a left branch for feeding the left molding cavity, a right branch for feeding the right molding cavity, and means for confining injected plastic material in the respective branches and molding cavities, the apparatus comprising means for
(a) adjusting the feed system to enable plastic material to be fed from the injection system through the left branch to the left molding cavity;
(b) pressurizing the injection system to inject the plastic material through the left branch to fill the left molding cavity;
(c) confining the plastic material injected into the left branch and the left molding cavity; and
(d) hold pressurizing the plastic material confined in the left branch and the left molding cavity; means for
(e) adjusting the feed system to enable plastic material to be fed from the injection system through the right branch to the right molding cavity;
(f) pressurizing the injection system to inject the plastic material through the right branch to fill the right molding cavity;
(g) confining the plastic material injected into the right branch and the right molding cavity; and
(h) hold pressurizing the plastic material confined in the right branch and the right molding cavity; and means for separating the injection system from the center block at a time when the injection system is not being pressurized in accordance with step (b) or step (f).

13. An apparatus according to claim 12, comprising movable packing means for hold pressurizing the plastic material confined in the respective branches and molding cavities; and means for moving the packing means to further hold pressurize the plastic material respectively confined in the left branch and the left molding cavity and the right branch and the right molding cavity.

14. An apparatus for controlling hold pressure applied to molding cavities of a stacked multi-parting injection molding system having desynchronized injection periods, including left, center and right molding blocks disposed for movement with respect to each other along a common axis and defining a left molding cavity between the center and left molding blocks and a right molding cavity between the center and right molding blocks, when cyclic injection molding a plastic material by utilizing a combination of the center block and an injection system which together encompass an adjustable feed system having within the center block a left branch for feeding the left molding cavity, a right branch for feeding the right molding cavity, and means for confining injected plastic material in the respective branches and molding cavities, the apparatus comprising means for
(a) adjusting the feed system to enable plastic material to be fed from the injection system through the left branch to the left molding cavity;
(b) pressurizing the injection system to inject the plastic material through the left branch to fill the left molding cavity;
(c) confining the plastic material injected into the left branch and the left molding cavity; and
(d) hold pressurizing the plastic material confined in the left branch and the left molding cavity; and means for
(e) adjusting the feed system to enable plastic material to be fed from the injection system through the right branch to the right molding cavity;
(f) pressurizing the injection system to inject the plastic material through the right branch to fill the right molding cavity;
(g) confining the plastic material injected into the right branch and the right molding cavity; and
(h) hold pressurizing the plastic material confined in the right branch and the right molding cavity;
wherein the confining means are movable; and
wherein the apparatus further includes means for moving the confining means to further hold pressurize the plastic material confined in the left branch and the left molding cavity.

15. An apparatus according to claim 14, wherein the confining means are located within the respective left and right branches; and wherein the apparatus includes means for moving the confining means within the left branch to further hold pressurize the plastic material confined in the left branch and means for moving the confining means within the right branch to further hold pressurize the plastic material confined in the right branch.

16. An apparatus according to claim 14, wherein the portion of the feed system within the center molding block further includes a runner stem that divides into the left and right branches for feeding plastic material from the injection system to the left and right branches;

wherein the confining means are located within the runner stem; and wherein the system includes means for moving the confining means in the runner stem to hold pressurize the plastic material respectively confined in the left branch and in the right branch.

17. An apparatus according to claim 16, wherein the confining means include a one-way valve that allows plastic material to flow only toward the molding cavities.

18. An apparatus for applying hold pressure in a stacked multi-parting injection molding system that includes a center block and left and right end blocks disposed for movement with respect to each other along a common axis and defining a left molding cavity between the center and left blocks and a right molding cavity between the center and right blocks, when cyclic injection molding a plastic material by utilizing an adjustable feed system that includes a runner stem for receiving injected plastic material from a pressurized injection system, a left branch for feeding the injected plastic material from the runner stem to the left molding cavity and a right branch for feeding the injected plastic material from the runner stem to the right molding cavity; confining means in the runner stem for confining injected plastic material within the feed system; and a common movable packing means in the center block connected to the feed system between the confining means and the left and right molding cavities which enables hold pressure to be applied simultaneously to plastic material withheld in the left and right branches of the feed system, the apparatus comprising means for
(a) adjusting the feed system to enable plastic material to be fed from the injection system through the left branch to the left molding cavity;
(b) pressurizing the injection system to inject the plastic material through the left branch to fill the left molding cavity;
(c) confining the plastic material injected into the left branch and the left molding cavity;

(d) moving the common packing means to hold pressurize the injected plastic material confined in the left branch and the left molding cavity; and means for (e) adjusting the feed system to enable plastic material to be fed from the injection system through the right branch to the right molding cavity;

(f) pressurizing the injection system to inject the plastic material through the right branch to fill the right molding cavity;

(g) confining the plastic material injected into the right branch and the right molding cavity; and (h) moving the common packing means to hold pressurize the injected plastic material confined in the right branch and the right molding cavity.

19. An apparatus for controlling hold pressure applied to molding cavities of a stacked multi-parting injection molding system having desynchronized injection periods, including left, center and right molding blocks disposed for movement with respect to each other along a common axis and defining a left molding cavity between the center and left molding blocks and a right molding cavity between the center and right molding blocks, when cyclic injection molding a plastic material by utilizing a combination of the center block ad an injection system which together encompass an adjustable feed system having within the center block a left branch for feeding the left molding cavity, a right branch for feeding the right molding cavity, and means for confining injected plastic material in the respective branches and molding cavities, wherein the molding cavities have desynchronous opening periods the apparatus comprising means for (a) adjusting the feed system to enable plastic material to be fed from the injection system through the left branch to the left molding cavity;

(b) pressurizing the injection system to inject the plastic material through the left branch to fill the left molding cavity;

(c) confining the plastic material injected into the left branch and the left molding cavity; and (d) hold pressurizing the plastic material confined in the left branch and the left molding cavity;

means for (e) adjusting the feed system to enable plastic material to be fed from the injection system through the right branch to the right molding cavity;

(f) pressurizing the injection system to inject the plastic material through the right branch to fill the right molding cavity;

(g) confining the plastic material injected into the right branch and the right molding cavity; and (h) hold pressurizing the plastic material confined in the right branch and the right molding cavity;

means for locking one of the molding cavities to maintain it in a closed position while hold pressure is being applied thereto and while the other molding cavity is open; and means for applying axial clamping force to the locked molding cavity by expanding the thickness of at least one of the molding blocks that defines the locked molding cavity.

* * * * *